Aug. 4, 1964 H. E. STRAM 3,142,927
SONIC FISH BAIT
Filed Oct. 13, 1961

INVENTOR.
HAROLD E. STRAM
BY
WILSON, SETTLE & CRAIG
ATTORNEYS

… … …

United States Patent Office 3,142,927
Patented Aug. 4, 1964

3,142,927
SONIC FISH BAIT
Harold E. Stram, 3110 Wentworth, Livonia, Mich.
Filed Oct. 13, 1961, Ser. No. 144,907
2 Claims. (Cl. 43—42.31)

This invention relates to a sound-producing or noise-making artificial fishing lure, and more particularly to a sound-producing artificial fishing lure wherein the sound is generated by relative movement between the lure and water through which it is pulled to directly actuate a movable clapper which is caused to contact a sounding tube or body in a repetitive manner to generate a continuous pattern of tapping sound.

The prior art has recognized the fact that a fishing lure can be appealing both to the eyes and to the sound sensory organs of fish. To this end, various optical decorations have been applied to fishing lures to make them similate natural bait to attract fish, and also sound-producing mechanisms of various and sundry kinds have been built into artificial fishing lures to provide attractiveness for the lure to the sound sensing organs of fish.

However, the prior art devices of the sound-producing variety have been characterized by a substantial degree of complexity; and particularly in a highly competitive market, the complex prior art structures have been generally too expensive to manufacture because of the many parts contained therein to reach a broad market. Further, the prior art devices have been characterized by a tendency to foul readily because of the use therein of such things as gear wheels working against vibratable reeds and the like. Also, in the prior art it has been disclosed that audible fishing lures can be produced by electric buzzer systems contained within a lure. However, it will be obvious that these devices are necessarily heavy because of the self-contained power force in the form of a battery and the batteries wear out and require expensive replacement.

If an audible fishing lure of highly simplified configuration adapted to produce a delicately adjustable and continuous sound pattern could be provided which could also be highly decorated to provide optical attraction and could be made in the form of a small fish, to provide further attraction to live fish, a substantial step forward in the art of artificial lure manufacture would be provided.

Accordingly, it is an important object of the present invention to provide a novel artificial fishing lure of simplified configuration for producing a fish-attracting sound pattern.

A further object is to provide a novel sound-producing fish lure of simplified configuration wherein a freely movable clapper is actuated by water passing thereover to be thrown into repeated sound-producing contact with an associated sounding tube or body.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The Invention

Figure 1:
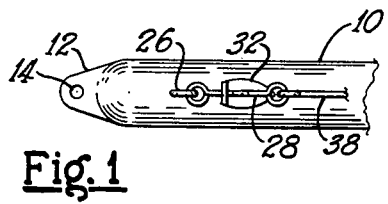
FIGURE 1 is a partial plan view of a fishing lure made in accordance with a first embodiment of the present invention.
Figure 2:
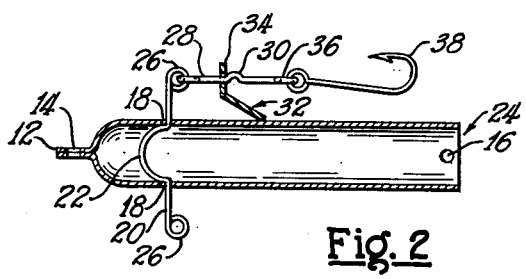
FIGURE 2 is a longitudinal sectional view of the FIGURE 1 embodiment.

The first embodiment of the invention is illustrated in FIGURES 1 and 2 and includes an elongated tubular body 10 having a flattened nose portion 12 at the front end thereof. The nose portion 12 is drilled or punched to provide an aperture 14 whereby a suitable leader of nylon or the like can be connected to the elongated tubular body 10 for casting the fishing device of the present invention or otherwise retaining the fishing device on a fishing line for drawing it through the water.

As shown in FIGURE 2, it will be noted that the rear end of the elongated tubular body 10 is open and is provided with one or more apertures 16 for attachment of a desired number of fish hooks, see FIGURE 6. From the foregoing it will be observed that the fishing lure of FIGURES 1 and 2, comprising the first embodiment of the invention, can be made from suitable tube stock that is capable of being drilled and flattened as at 12 to provide the nose portion.

As best shown in FIGURE 2, a pair of oppositely disposed holes 18 are formed in the tubular wall of the body 10 and spaced rearwardly from the flattened nose portion 12. In forming the present embodiment of the invention, a wire 20 having a loop 26 on one end thereof but unlooped on the other end at this time is passed through the oppositely disposed holes 18 traversing the tubular body member 10. With the wire 20 retained temporarily in this position, a punch is inserted into the open rear end 24 and the wire 20 is dimpled as at 22 whereby it is retained in fixed transverse position with respect to the tubular body 10. Thereafter, the former straight end is looped as at 26.

Into the loop 26 there is fitted a clapper-carrying wire 28 having a dimple 30 optionally formed at a median portion thereof. The front end of the clapper-carrying wire 28 is looped through the loop 26 of the transverse retainer wire 20 and a freely vibratable generally L-shaped clapper 32 having a suitable aperture in the arm 34 thereof is fitted on the clapper-carrying wire 28 forwardly of the dimple 30. The rear end of the clapper-carrying wire 28 is also looped at 36 for cooperation with a fish hook 38. The reason why the dimple 30 is optionally formed in the clapper-carrying wire is to keep the clapper 32 forwardly of the loop 36 so that it is able to rotate freely or vibrate freely when the unit is drawn through the water and thus will not be placed adjacent the loop 36 with the possibility of binding. However, this possibility is remote when a large aperture is formed in the arm 34 of the clapper 32.

Although not shown, the bottom loop 26 is similarly provided with a clapper carrying wire 28 and a clapper 32 with a fish hook 38 in the manner shown for the top loop 26.

Operation of Embodiment I

In view of the fact that the clapper 32 is freely mounted on the clapper carrying-wire 28, it will be observed and understood that when the unit is pulled through water, the clapper 32 will freely vibrate by passage of the water over the exterior of the tubular body 10 and that the free end of the clapper will tap gently in a repeated manner against the side of the tubular body 10. This will be effective to provide a continuous sound pattern for the attraction of fish.

Also, the exterior of the tubular body 10 can be provided with decorative colors that are attractive optically to fish to add a secondary attraction to the lure of the first embodiment of the present invention.

With further regard to the embodiment shown in FIGURES 1 and 2, it is to be considered within the scope of the invention to apply O-ring seals or sealing rubber grommets within the transversely disposed holes 18 to provide a waterproof seal around the retainer wire 20 to prevent entry of water into the front of the unit. Also, when the flattened nose portion is formed, a waterproof seal will be provided by the press fit of the metal together.

By utilizing this configuration, a pocket of air will be trapped within the interior of the tubular body 10 because the back open end 24 will tend to drop downwardly by its weight and thus when the clapper 32 taps against the body 10 a slightly different resonant effect will be provided as compared to a water-filled body 10.

The Second Embodiment

Figure 3:
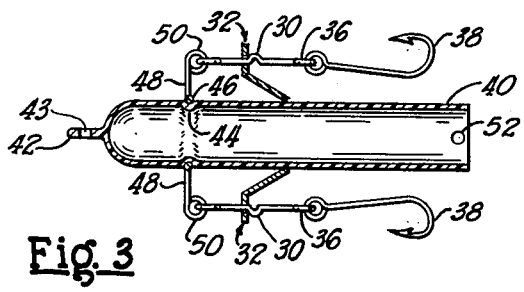
FIGURE 3 is a longitudinal sectional view of a second embodiment of the present invention.

The second embodiment of the invention is illustrated in FIGURE 3 and provides a water-tight tube except at the rear as discussed above for an alternate embodiment of FIGURES 1 and 2. As shown in FIGURE 3, the tubular body is designated as 40 and has a flattened nose portion 42 with a line connecting aperture 43. Rearwardly of the nose portion 42, the tubular body 40 is provided with a circumferentially extending dimple or groove 44 which is adapted to receive a ring element 46 in snap-fitted relationship by being passed over the front end of the unit. It is to be considered within the scope of the invention to form the second embodiment of extruded resilient plastic tubing so that the ring 46 can easily be pressed over the exterior of the body 40 and popped into the circumferential groove 44. In this embodiment of the invention, one or more radially extending wires 48 are fastened at one end as by welding to the ring 46 and are provided at their outer ends with loops 50. Clapper-carrying wires 28 which are dimpled as at 30 to carry a clapper 32 are connected by looping to the loops 50 as in the embodiment described above. Hooks 38 are carried at the loops 36 formed on the rear end of the clapper-carrying wires 28. Additional hooks can be attached at the rear apertures 52.

Operation of the Second Embodiment

It will be observed from the foregoing description that the forward end of the second embodiment of the invention, as shown in FIGURE 3, is watertight to form an air pocket to give one form of harmonic sound reproduction as the clapper 32 strikes the sounding tube 40.

Also, where desired, the front end of the body 40 of the embodiment of FIGURE 3 can be provided with a suitable aperture so that the unit will fill with water to give a second form of sound intonation to the unit.

Extended Scope of Invention

Materials of construction which can be utilized for producing the body members of the various embodiments of the present invention can be tubes of any section, such as circular, polygonal and the like.

Also, it is to be included within the broad scope of the invention where the clapper assemblies are attached to the outside of the unit, to use hollow spheres either perforated or water-proof construction, egg shaped or elliptical sectioned bodies that can be either hollow for retaining an air space therein or where it is desired that the unit not be buoyant and sink, that they may be perforated so that water will flow into the interior and carry the unit into the depths of a lake or stream being fished.

In some instances, it may be desirable to use resonant bodies that are solid, such as phenolic resins, for still further sound variation.

Materials of construction adapted to use in the present invention include the various metals that when struck by the clapper will produce a fish-attracting sound; also, glass and resins having sufficient resonance to provide a fish-attracting sound can be used. Typical resins would include the phenolics polycarbonates, certain of the hard nylons and the like.

As previously mentioned, finishes of one type or another can be utilized to provide a flashy optical attraction for the fish, in addition to the sound-producing attraction. Thus, it is to be included within the scope of the invention to apply the finishes by vacuum coating techniques, conventional metal plating techniques, buffing, polishing, painting, lacquering, dipping and the like.

In the units of the present invention using tubular or other elongated bodies, these can be formed by cutting sections of extruded pipes and the like.

The clappers of the invention are subject to a certain degree of modification and still fall within the scope of the disclosure. Half propellers, whole propellers and multi-bladed fan type units can be positioned on the clapper-carrying wire whereby they will be moved or rotated upon passage through the water, the important provision being that the hole by which they are fitted upon the clapper-carrying wire be large enough to permit free rotation or vibration for tapping against the body member of the unit in a sound-forming fashion.

In some instances it may be desirable either to die cast or injection mold the units of the invention in accordance with known mass production techniques to reduce further the cost and improve the competitive factor inherent in the various embodiments of the present invention.

Summary and Advantages

From the foregoing, it will be observed that the present invention provides a novel approach to a sound-producing fishing lure, in the form of a foul-resistant and very simply manufactured and thus highly competitive article of manufacture. Further, the present fishing lure is characterized by a flashy appearance or optically attractive decorative finish for additional attraction to fish.

It is to be noted that it is an important advantage of the present invention that the units are economical of manufacture, having a minimum number of parts requiring little assembly time, and in view of the fact that a minimum number of freely movable parts are utilized, fouling as by catching in lily pads, seaweeds or the like will be reduced.

I claim:

1. In an audible fishing lure, an elongated hollow body member closed at the front to form a fish line attachment connection, said elongated hollow body member being open at the rear end, said body member being provided with oppositely disposed apertures adjacent the front end, a transverse retainer member positioned to extend through said oppositely disposed apertures, means for holding said transverse retainer member in position, at least one clapper carrier connected to the free end of said transverse retainer member to extend along the exterior of said tubular body member in spaced relation thereto, means for connecting a fish hook to said tubular body member, and a water-actuatable clapper freely threaded on said clapper carrier, whereby movement of said elongated hollow body member and said clapper through water causes said clapper to move into repetitive tapping engagement with said body member to provide a continuous sound pattern.

2. A fish lure comprising an elongate hollow tubular main body member closed at one end, means at one end of said body member for attaching said body member to a fishing line, a fish hook retainer member mounted upon and projecting transversely from opposite sides of said body member adjacent said one end for coupling a fish hook to said body member, and a clapper element pivotally supported from the outer end of said retainer member for repetitive movement into sound producing contact with the exterior of said body member when said body member is longitudinally drawn through water.

References Cited in the file of this patent
UNITED STATES PATENTS

| | | |
|---|---|---|
| 1,295,617 | Shannon | Feb. 25, 1919 |
| 1,997,802 | Meyer | Apr. 16, 1935 |
| 2,281,578 | Heddon | May 5, 1942 |
| 2,927,391 | Herter | Mar. 8, 1960 |
| 2,977,705 | Busnel | Apr. 4, 1961 |
| 3,071,884 | Peltz | Jan. 8, 1963 |